(12) United States Patent
Li

(10) Patent No.: US 7,843,616 B2
(45) Date of Patent: Nov. 30, 2010

(54) BACKGROUND SUPPRESSION IN A MULTI-FUNCTION COLOR SCANNING SYSTEM

(75) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 366 days.

(21) Appl. No.: 12/056,395

(22) Filed: Mar. 27, 2008

(65) Prior Publication Data

US 2009/0244560 A1 Oct. 1, 2009

(51) Int. Cl.
G03F 3/08 (2006.01)
G06F 15/00 (2006.01)
G06K 9/64 (2006.01)

(52) U.S. Cl. .................... 358/518; 358/1.9; 382/274
(58) Field of Classification Search .............. None
See application file for complete search history.

(56) References Cited

U.S. PATENT DOCUMENTS

| | | | |
|---|---|---|---|
| 6,323,957 B1 * | 11/2001 | Ball | 358/1.9 |
| 6,674,899 B2 | 1/2004 | Nagarajan et al. | |
| 7,200,263 B2 | 4/2007 | Curry et al. | |
| 7,324,120 B2 | 1/2008 | Curry et al. | |
| 2002/0159080 A1 | 10/2002 | Feng et al. | |
| 2004/0052429 A1 | 3/2004 | Curry et al. | |
| 2004/0071362 A1 | 4/2004 | Curry et al. | |
| 2007/0019257 A1 * | 1/2007 | Li | 358/518 |

* cited by examiner

Primary Examiner—Twyler L. Haskins
Assistant Examiner—Barbara D Reinier
(74) Attorney, Agent, or Firm—Philip E. Blair; Fleit Gibbons Gutman Bongini & Bianco P.L.

(57) ABSTRACT

What is disclosed is a novel system and method for background suppression in the image path. In one example embodiment, an image is scanned and RGB color values generated for each pixel. Each of the pixels is converted into a Lab color space to obtain luminance and chrominance values. A background luminance and a luminance variation are determined for the scanned image. For each pixel, a determination is made whether that pixel is a white pixel or a non-white pixel based. If the pixel is a white pixel, an adjustment chrominance value for that pixel is determined. The value of the chrominance adjustment is modulated as a function of a difference between the white pixel's luminance and the background luminance. The modulated chrominance adjustment is applied to the white pixel. Adjusted and non-adjusted pixels are stored in a memory. A printer controller converts the pixels to an output space.

15 Claims, 4 Drawing Sheets

BACKGROUND SUPPRESSION IN A MULTI-FUNCTION COLOR SCANNING SYSTEM

TECHNICAL FIELD

The present invention is directed to systems and methods for background suppression in the image path of a xerographic or other multi-function document reproduction system.

BACKGROUND

Typically, in a digital reproduction device, a document or image is scanned by a digital scanner which converts the light reflected from the document into electrical charges representing the light intensity from predetermined areas (pixels) of the document. The pixels of image data are processed by an image processing system which converts the pixels of image data into signals which can be utilized by the digital reproduction machine to recreate the scanned image.

Sometimes the white regions in the original are not imaged as white regions in the produced document. Typically, digital scanning and multifunction devices provide the function of automatic background suppression to make white regions in the original white on scanned images or copies. The quality of background suppression is of great importance to many customers. Background detection and suppression in color systems is more challenging than in monochrome systems due to the more complex nature of the problem.

One method for background suppression is to perform the background suppression after the document processing system input is converted to a CIE Lab color space, where L* represents the luminosity, and a, b represent the chrominance components which define the difference between a color and a chosen reference color of the same intensity. Typically, the colored document is scanned by a scanner using a set of red, green, and blue (RGB) sensors which produces a data representation in terms of the RGB signals at each pixel location. The data is then converted into a luminance/chrominance space.

Background suppression is often performed in the chrominance channels. However, since chrominance channels tend to get adjusted independently of other pixel's chrominance and also independently of the luminance, a color shift tends to occur in some background regions. Although effective in avoiding color fidelity compromises in non-background areas, discontinuity between pixels classified as white and non-white may still occur between background and non-background areas.

Accordingly, what is needed in this art are increasingly sophisticated systems and methods for background suppression in the image path of a document reproduction system which provides a smooth transition in chrominance suppression between background and non-background areas.

BRIEF SUMMARY

What is provided is a novel system, method, and computer program product for background suppression in the image path of a xerographic, scanning, or other multi-function document reproduction system which provides a smooth transition in chrominance suppression between background and non-background areas.

In one example embodiment, the present method for background suppression in a multi-function color scanning system involves the following. An image is scanned into a plurality of pixels. RGB color values are obtained for each of the pixels of the scanned image. The RGB values are converted into a Lab color space by an RBG to Lab converter. Background luminance and a luminance variation are obtained for a default white point on the scanned image. Alternatively the background luminance is detected from the scanned image. Then, for each of the pixels, a determination is made whether a pixel is a white pixel or a non-white pixel. For each white pixel, an adjustment chrominance value for that pixel is determined. The value is then modulated as a function of the difference between the white pixel's luminance and the background luminance. White pixels are then adjusted by the modulated chrominance adjustment amount. Adjusted and non-adjusted pixels are stored in pixel memory. A printer controller converts the pixels to an output space.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided is a system and method for background suppression in the image path of a xerographic, scanning, or other multi-function document reproduction system.

It should be understood that one of ordinary skill in this art would be readily familiar with many facets of color science including chrominance and luminance detection and determination, and other techniques common to this art. Additionally, one of ordinary skill in this art would also be readily familiar with advanced mathematical algorithms used in the color science arts. One of ordinary skill in this art would also be knowledgeable about computer science and software and programming systems and methods sufficient to implement the functionality and capabilities described in detail herein in their own hardware environments without undue experimentation.

Figure 1:
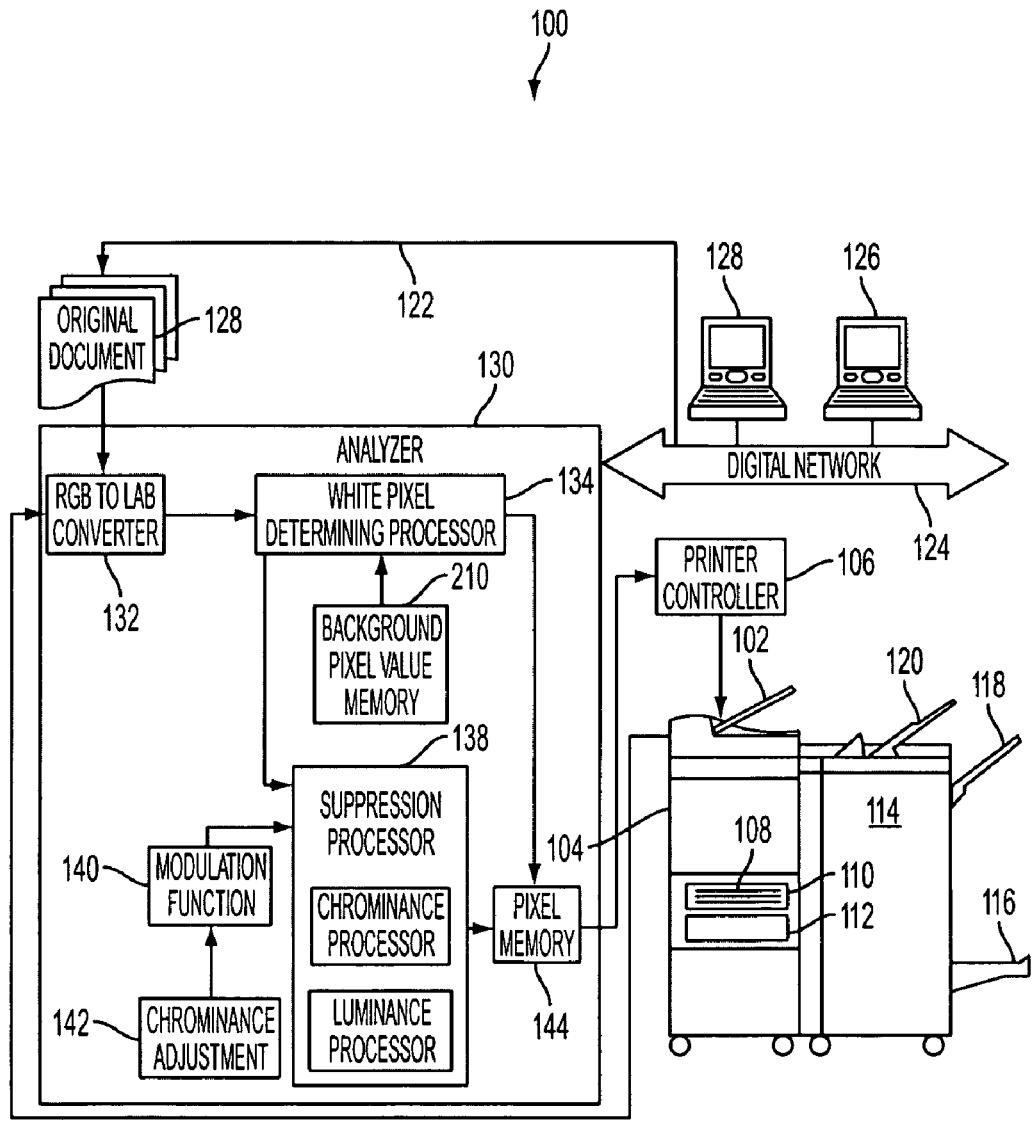
FIG. 1 illustrates one example multi-function color document reproduction system wherein various embodiments of the present method will find their intended uses.

Reference is being made to FIG. 1 which illustrates one example multi-function color document reproduction system wherein various embodiments of the present method will find their intended uses.

Document processing system 100 includes an image input device 102 such as an optical scanner which may include conversion electronics for converting documents to signals or pixels. The optical scanner 102 can be used to scan a document such as book pages, a stack of printed pages, or so forth, to create a digital image of the scanned document that is reproduced by document reproduction operations performed by the printing system.

The document processing system 100 further includes a printer or marking engine 104, and a print controller 106, all connected by one or more communication links such as telephone lines, computer cables, ISDN lines, and the like. The image input device is used to scan an original image document to a plurality of pixels having RGB color values. The RGB color values are converted to a luminance-chrominance (Lab) space, where L is the luminance component and a, b are the pixel's chrominance components of a first and second channel.

While the illustrated embodiment shows one marking engine 104, it will be appreciated that the system may include more than one marking engine which may be electro-photographic, ink-jet, including solid ink, and other devices capable of marking an image on a print media. The marking engines can be of the same print modality (e.g., process color (P), custom color (C), black (K), or magnetic ink character recognition (MICR)) or of different print modalities.

The marking engine is supplied with sheets 108 of various print media fed from paper trays 110 and 112. The print media can be substantially any type of media which the marking engine can print upon such as, for example, bond paper, copy paper, transparency sheets, high gloss paper, and so forth. Printed media from the marking engine is delivered to finisher 114 which includes print media output destinations such as output trays 116, 118, and 120. The marking engine includes a photoconductive insulating member which is charged to a uniform potential and exposed to a light image of an original document to be reproduced. The exposure discharges the photoconductive insulating surface in exposed or background areas and creates an electrostatic latent image on the photoconductive insulating member, which corresponds to the image document. Subsequently, the electrostatic latent image on the photoconductive insulating surface is made visible by developing the image with an imaging material such as a developing powder comprising toner particles subsequently transferred to the print media, to which the toner is permanently affixed in a fusing process. In a multi-color electrophotographic process, successive latent images corresponding to different colors are formed on the insulating member and developed with a respective toner of a complementary color. Each single color toner image is successively transferred to the paper sheet in superimposed registration with the prior toner image to create a multi-layered toner image on the paper. The superimposed toner images may be fused in a single fusing process by a fuser (not shown). It will be appreciated that other suitable processes for applying an image may be employed.

The fuser receives the imaged print media from the image-forming component and fixes the toner image to the surface of the print media. The fuser can be of any suitable type, and may include fusers which may apply one or more of heat or other forms of electromagnetic radiation, pressure, electrostatic charges, and sound waves, to form a copy or print.

An original document 128 or image or print job or jobs can be supplied to the document reproduction system 100 in various ways. Print jobs can be scanned by optical scanner 102 or electronically delivered to the system controller 106 via a wired connection 122 from a digital network 124 that interconnects example computers 126, 128, or other digital devices and/or services. A wireless network or other wireless digital communication pathway may be employed instead or additionally to connect the system to a digital network such as a Local Area Network (LAN), Ethernet, Wireless LAN, the Internet, some combination thereof. Various print jobs or portions thereof can be delivered to the document reproduction system in other ways such as, for example, an optical disk reader built into the printing system, a portable data storage device, or using a dedicated computer connected to the printing system which accepts media and transfers that media to the system via the connection.

In one embodiment, the document reproduction system 100 includes analyzer 130. The analyzer is a software and/or hardware construct which manipulates chrominance values for various pixels in original document 128. The analyzer includes an RGB to Lab converter 132, a white pixel determination processor 134, a background pixel value memory 210, and a suppression processor 138 which incorporates, in the embodiment illustrated, a chrominance and a luminance processor. The chrominance process applies a chrominance adjustment, if any, to the pixels of the original document. A luminance processor applies a luminance adjustment, if any, to the pixels of the original document. Analyzer 130 further includes, in the embodiment shown, a chrominance adjustment unit 142 which determines a chrominance adjustment value for the white pixels, and a modulation function 140 which modulates the determined chrominance adjustment values and provides the same to the suppression processor. Analyzer 130 further includes, in this embodiment, a pixel memory 144 which is in communication with printer controller 106. The print controller converting all the pixels in the memory to an output space, such as a print media via marking engine 104.

It should be understood that the embodiment illustrated is only one example of a xerographic, color scanning, or other multi-function document reproduction system within which various embodiments of the present method will find their intended uses. Other embodiments of document reproduction systems capable of incorporating or otherwise making use of, the various embodiments of the present method as provided herein are envisioned and are intended to fall within the scope of the appended system claims.

Figure 2:
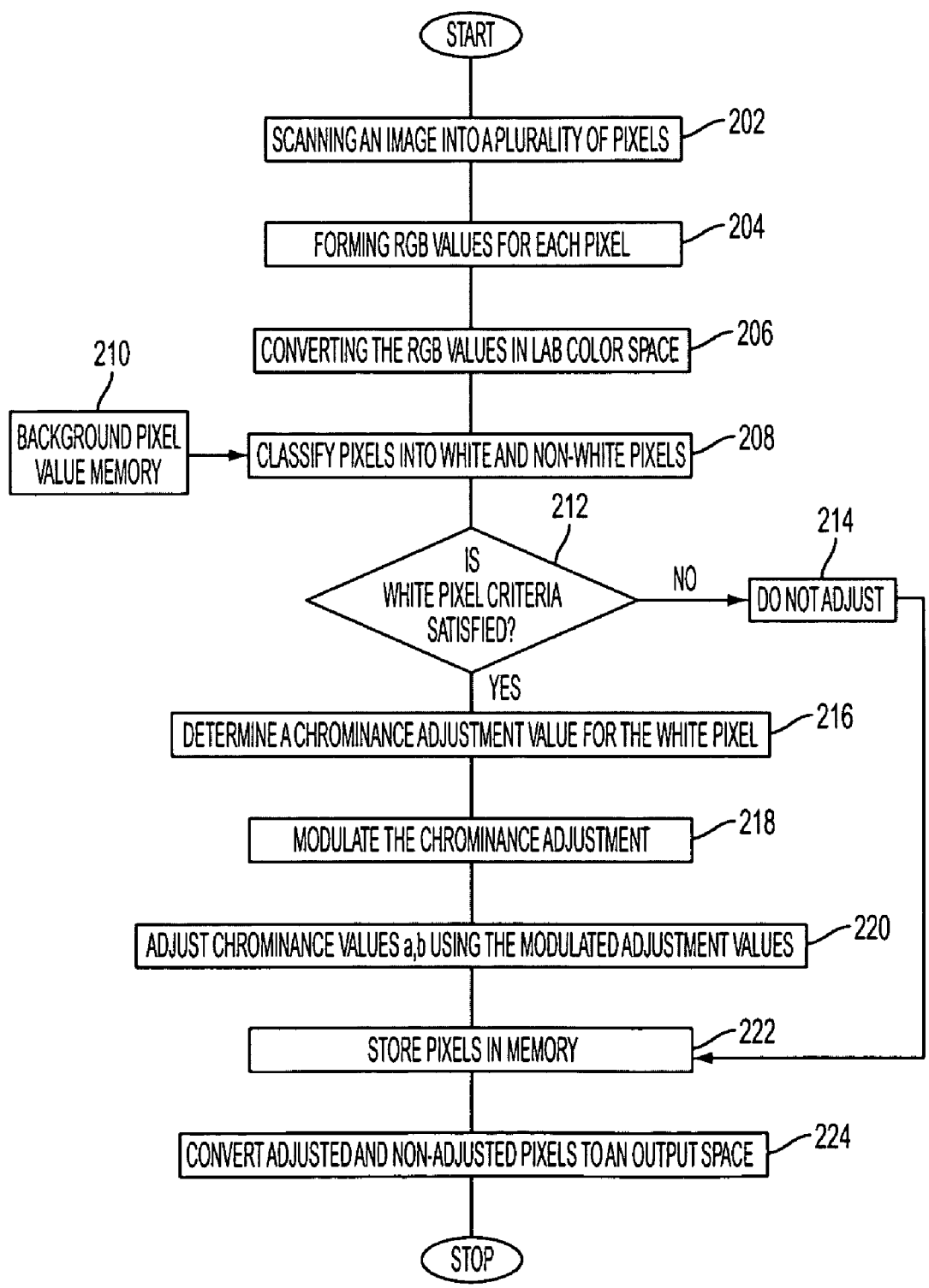
FIG. 2 is a flow diagram of one embodiment of the present method for background suppression in the image path of a xerographic, scanning, or other multi-function document reproduction system.

Reference is now being made to FIG. 2 illustrating one embodiment of the present method for background suppression in the image path of a xerographic, color scanning, or other multi-function color document reproduction system.

In one example embodiment, at step 202, an image is scanned into a plurality of pixels using the optical scanner 102 of the document reproduction system 100. At step 204, RGB color values are obtained for each of the pixels of the scanned image. At step 206, the RGB values for each pixel are converted into a Lab color space by RBG to Lab converter 132 such that luminance (L) and chrominance (a, b) values of each pixel are obtained. The value of a pixel's chrominance (a) is the chrominance value in a first channel. The value of a pixel's chrominance (b) is the chrominance value in a second channel. It should be understood that a Lab color space is a color-opponent space with dimension L* for luminance and a and b for the color-opponent dimensions, based on non-linearly compressed CIE XYZ color space coordinates. Lab is now more often used as an informal abbreviation for the CIE 1976 (L*a*b*) color space (also called CIELAB, whose coordinates are L*, a*, and b*). A background luminance value for a default white point on the scanned image and a luminance variation are obtained and stored in background pixel value memory 210. Alternatively the background luminance is detected from the scanned image.

Pixels are classified 208 into white and non-white pixels by white pixel determining processor 134 based, at least in part, on one or both of the pixel's luminance and chrominance values. If, at step 212, a pixel does not meet the criteria for being a white pixel then the non-white pixel is not adjusted 214. Non-adjusted (non-white) pixels are stored 222 with adjusted pixels in pixel memory 144. If, at step 212, a pixel is a white pixel then chrominance adjustment value is determined 216 for that white pixel by chrominance adjustment processor 142. The chrominance adjustment value is modulated 218 by modulation function 140 which modulates the amount of chrominance adjustment as a function of the difference between the white pixel's luminance and the background luminance. The chrominance values a, b of the white pixels is adjusted 220 using the modulated chrominance adjustment value in suppression processor 138. The adjusted pixels are stored 222 in pixel memory 144. Printer controller 106 converts the adjusted and non-adjusted pixels stored in the pixel memory to an output space such as print media 108 using marking engine 104.

Figure 3:
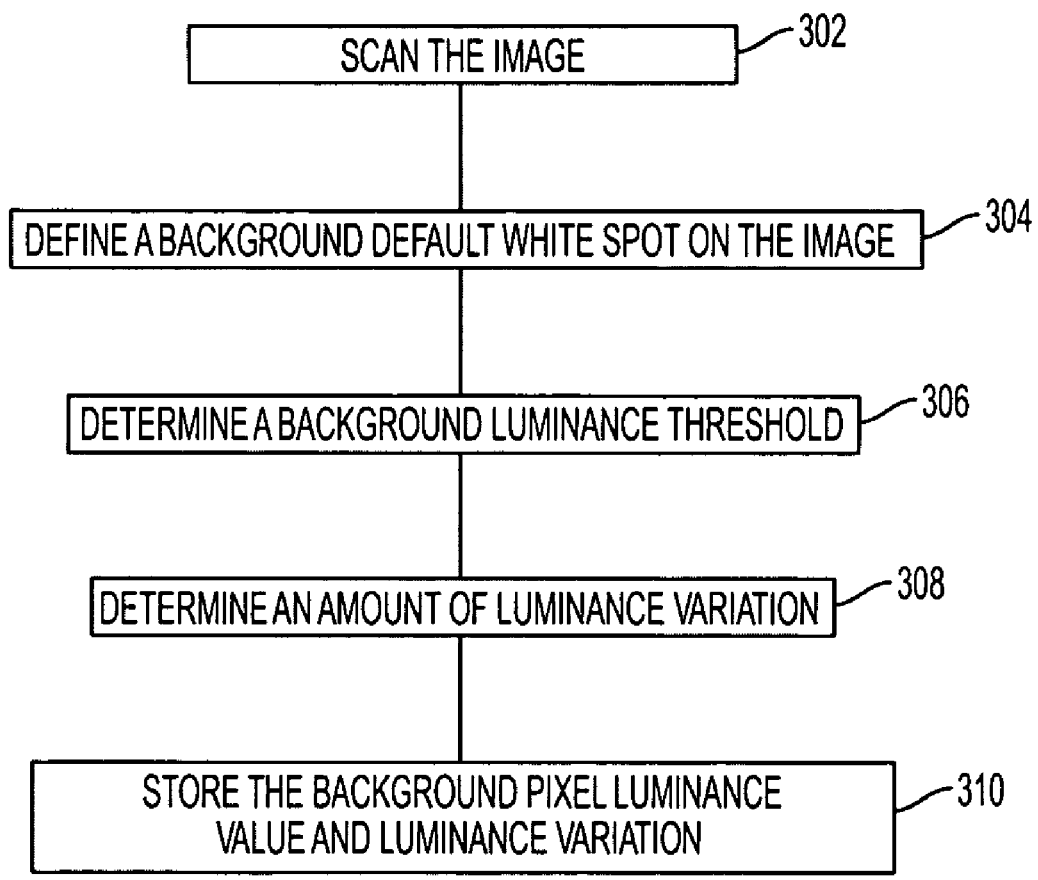
FIG. 3 illustrates a flow diagram wherein a background luminance of a default white spot and a luminance variation are determined and stored in background pixel value memory 210.

Reference is now being made to FIG. 3 which illustrates one embodiment wherein a background luminance and a luminance variation are determined and stored in background pixel value memory 210 of FIGS. 1 and 2.

An image is scanned 302 by the optical scanner 102 of document processing system 100 to generate a digital representation of the scanned sheet in a manner similarly described with reference to step 202 of FIG. 2. A default white spot is defined 304 in the scanned image. A background luminance value is determined 306 by one of known methods, one of which is described in U.S. Pat. No. 7,551,334 to Li which is incorporated herein by reference in its entirety. Determining a background luminance value of a document may include compiling a histogram of the image intensity values from pixels within the selected default area. The histogram background peak, the standard deviation from the peak, and a white pixel threshold or background luminance threshold $T_W$ is determined. The background peak value is the gray scale level with greatest number of pixels having an intensity related to the background level value or the white pixels values of the image being scanned. Optionally, or alternatively, the white pixel threshold $T_W$ is a predetermined value. For example, the white pixel threshold $T_W$ can be determined or pre-specified to be equal to 220, 230, etc. depending on the calibration of the input optical scanning device and/or user preferences.

An amount of luminance variation ($\Delta L$) in the scanned image is determined 308. The luminance variation is, in one embodiment, an adjustable white pixel threshold parameter or white pixel or a user-defined luminance threshold offset.

The background luminance (backgroundL) and luminance variation ($\Delta L$) are stored 310 in background pixel value memory 210 of FIGS. 1 and 2.

It should be understood that the flow diagrams depicted herein are illustrative. Other operations, for example, may be added, modified, enhanced, condensed, integrated, or consolidated. Variations thereof are envisioned and are intended to fall within the scope of the appended claims.

With reference now being made again to FIGS. 1 and 2, an original document 128 is scanned to generate a plurality of pixels in RGB color space. The RGB values of the pixels are converted to a luminance-chrominance space (Lab). The absolute values of a pixel's chrominance (a, b) are determined by:

$$absA = |a - \text{offset}A|$$

$$absB = |b - \text{offset}B|$$

where offsetA is an adjustable chrominance parameter or chrominance value offset in the first chrominance channel, and offsetB is an adjustable chrominance parameter or chrominance value offset in the second chrominance channel.

A determination is made in analyzer 130 in white pixel determining processor 134 whether a pixel is a white pixel or a non-white pixel. Pixels of the scanned image are classified into white and non-white pixels based on the pixel's luminance and chrominance values. If a pixel is determined to be a white pixel then the chrominance (a, b) of each white pixel are adjusted by a modulated chrominance adjustment value as described in detail herein further. Otherwise, non-white pixels are not adjusted.

A pixel is determined to be a white pixel if its luminance and chrominance meet the following criteria:

Luminance $\geq$ (backgroundL $- \Delta L$)

Chrominance $= \max(|a-\text{offset}A|, |b-\text{offset}B|) + \min(|a-\text{offset}A|, |b-\text{offset}B|)/2 < T_C$ The chrominance of each pixel can be compared to a pre-specified chrominance threshold $T_C$ to ensure that a pixel's chrominance value is substantially low. It should be understood that the above method of calculating chrominance is one example. Other methods for calculating chrominance are well known in this art.

If a pixel is determined to be a white pixel then values for a chrominance adjustment 140 are obtained for the first and second channels (a,b) of that pixel using indexed entries in a chrominance adjustment table. In one example, the chrominance adjustment values are obtained from Table 1. The index column of chrominance adjustment Table 1 represents a number of entries which, in this example, is equal to 32 entries (0-31). An output column represents a chrominance adjustment value. It is contemplated that different adjustable tables can be used for individual chrominance channels.

TABLE 1

| Chrominance Adjustment | |
|---|---|
| Index | Value |
| 0 | 0 |
| 1 | 1 |
| 2 | 2 |
| 3 | 3 |
| 4 | 4 |
| 5 | 4 |
| 6 | 4 |
| 7 | 3 |
| 8 | 2 |
| 9 | 0 |
| 10 | 0 |
| 11 | 0 |
| 12 | 0 |
| 13 | 0 |
| 14 | 0 |
| 15 | 0 |

The adjustment is defined only for a sub-set of possible input chrominance values since, when the input (absolute) luminance value is high, it will not satisfy the "white" conditions and therefore no adjustment will be applied.

The chrominance adjustment value in the first channel (a) of each white pixel is determined from Table 1 as follows:

$$a_{out} = \text{Table1}(absA).$$

The chrominance adjustment value in the second channel (b) of each white pixel is determined from Table 1 as follows:

$$b_{out} = \text{Table1}(absB).$$

Once the chrominance adjustment value for each channel of a white pixel has been obtained, that adjustment value is modulated 140, in one embodiment, as follows:

$$k = \max(0, \text{background}L - L)$$

$$\text{adjust}A = (a_{out} * \text{ModulationTable2}[k] + 8) >> 4;$$

$$\text{adjust}B = (b_{out} * \text{ModulationTable2}[k] + 8) >> 4;$$

It should be understood that the mathematical notation ">>4" means shifting 4 bits to the right. One skilled in this art would understand a bit shift operation. Note that the number of shifts, in this case 4, is related to the number of bits in the table entries. Further, one skilled in this art would appreciate that a bit shifting operation is a mathematical operation which can be performed efficiently in hardware well known in the arts.

One example of the modulation table hereof is shown in Modulation Table 2.

TABLE 2

| Index | Value |
|---|---|
| 0 | 16 |
| 1 | 16 |
| 2 | 15 |
| 3 | 14 |
| 4 | 12 |
| 5 | 9 |
| 6 | 7 |
| 7 | 5 |
| 8 | 4 |
| 9 | 3 |
| 10 | 2 |
| 11 | 2 |
| 12 | 1 |
| 13 | 1 |
| 14 | 0 |
| 15 | 0 |

The modulated chrominance adjustment values for each white pixel are then applied to that white pixel by suppression processor 138 as follows:

```
if (a − offsetA > 0) then a = max(a − adjustA, offsetA);
else a = min(a + adjustA, offsetA);
if (b − offsetB > 0) then b = max(b − adjustB, offsetB);
else b = min(b + adjustB, offsetB).
```

In the above relationship, if the difference between the white pixel's chrominance value in the first channel (a) and the chrominance offset is greater than zero then the white pixel's chrominance in the first channel becomes the value of the maximum of either: the difference between the white pixel's chrominance value and the modulated chrominance adjustment value; or the amount of chrominance offset for that channel. Otherwise, the white pixel's chrominance becomes the minimum of either: the sum of the white pixel's chrominance and the modulated chrominance adjustment value; or the amount of chrominance offset in that channel. The white pixel's chrominance in the second channel (b) is determined in a similar manner.

Adjusted and non-adjusted pixels are stored in pixel memory 144. Printer controller 106 converts the adjusted and non-adjusted pixels stored in the pixel memory 144 to an output space such as print media 108 using, for example, marking engine 104 of document processing system 100.

In this manner, the amount of chrominance adjustment is modulated as a function of a difference between the white pixel's luminance and the background luminance. White pixels are adjusted continuously in the first and second chrominance channels. This results in the smooth transition from the adjusted pixels to the pixels that are not adjusted. This approach limits chrominance suppression to the background area, without affecting color in non-background areas.

One skilled in this art would readily be able to implement the above-described method on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. Such an implementation would then be integrated into the constraints of a specific document reproduction environment.

Figure 4:
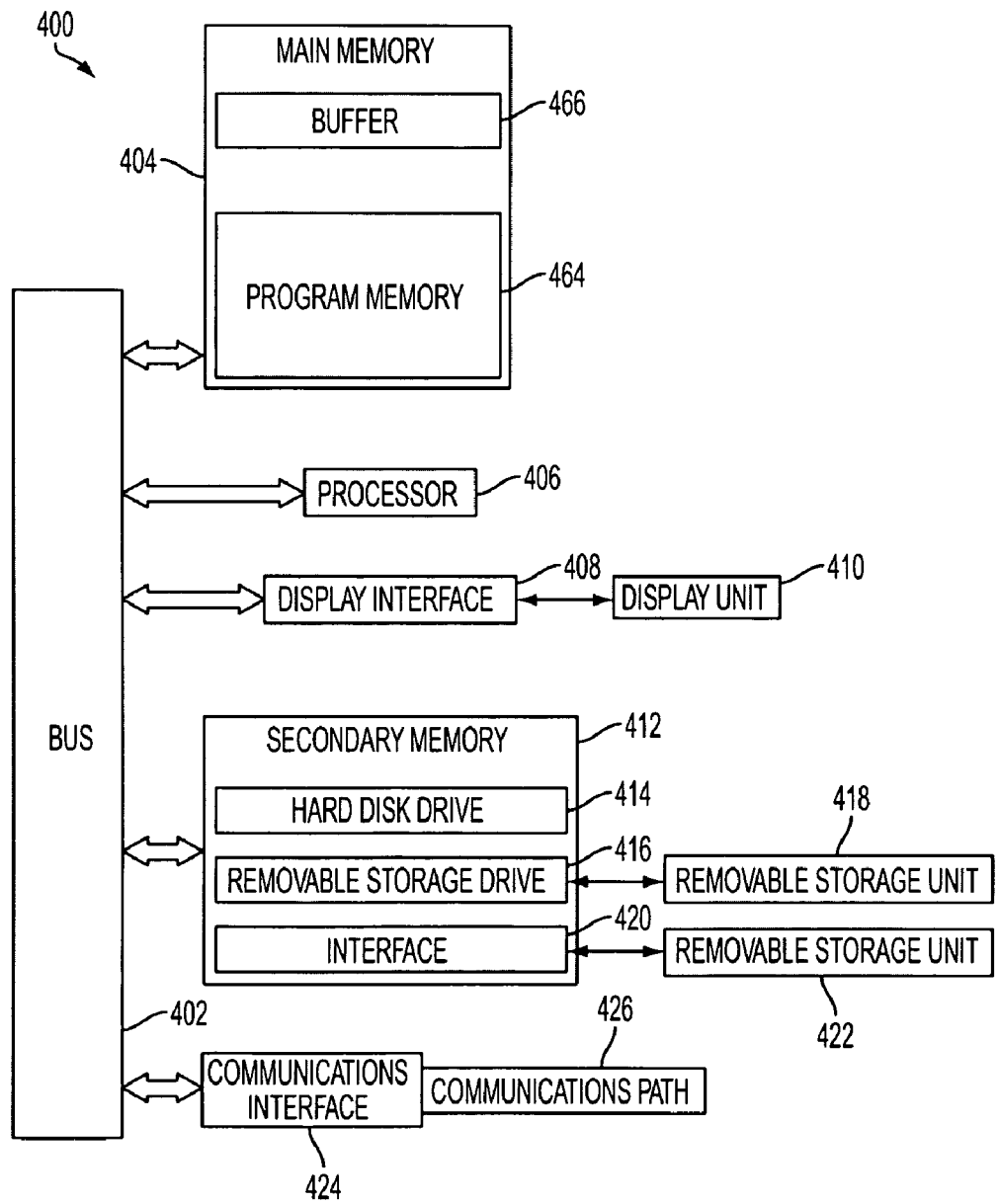
FIG. 4 is a block diagram of one embodiment of a computer system useful for implementing the present method hereof.

Reference is now being made the system of FIG. 4 illustrating a block diagram of one embodiment of a computer system useful for implementing the present method hereof.

The computer system 400 can be a xerographic system, a photocopier, or printing device. The computer system includes one or more processors, such as processor 406 capable of executing machine executable program instructions. In the embodiment shown, the processor is in communication with bus 402 (e.g., a backplane interface bus, crossover bar, or data network). The computer system also includes a main memory 404 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 466 to temporarily store data for access by the processor, and a program memory 464 that includes, for example, executable programs that implement the methods described herein. The program memory is capable of storing a subset of the data that is less than all of the data contained in the buffer.

Computer system 400 includes a display interface 408 that forwards data from communication bus 402 (or from a frame buffer not shown) to display 410. The computer system also includes a secondary memory 412. The secondary memory may include, for example, a hard disk drive 414 and/or a removable storage drive 416 which reads and writes to removable storage unit 418, such as a floppy disk, magnetic tape, optical disk, etc., that stores computer software and/or data.

In an alternative embodiment, the secondary memory 412 includes other similar mechanisms for allowing computer programs or other instructions to be loaded into the computer system. Such mechanisms may include, for example, a removable storage unit 422 adapted to exchange data through interface 420. Examples of such mechanisms include a program cartridge and cartridge interface (such as that found in video game devices), a removable memory chip (such as an EPROM, or PROM) and associated socket, and other removable storage units and interfaces 420 which allow software and data to be transferred from the removable storage unit to the computer system.

The computer system 400 includes a communications interface 424 which acts as both an input and an output to allow software and data to be transferred between the computer system and external devices. Examples of a communications interface include a modem, a network interface (such as an Ethernet card), a communications port, a PCMCIA slot and card, etc.

Software and data transferred via the communications interface are in the form of signals which may be, for example, electronic, electromagnetic, optical, or other signals capable of being received by communications interface 424. These signals are provided to communications interface via a communications path 426 (i.e., channel) which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 404 and secondary memory 412, removable storage drive 416, a hard disk installed in hard disk drive 414, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

The invention claimed is:

1. A method for background suppression in a multi-function color scanning system, the method comprising:
   scanning an image into a plurality of pixels;
   generating RGB color values for each of said pixels;
   converting said RGB color values for each of said pixels into a Lab color space to obtain a luminance value L, and chrominance values a and b for each pixel;
   determining a background luminance, backgroundL, of said scanned image;
   determining whether a pixel is a white pixel or a non-white pixel based on said pixel's luminance and chrominance values;
   in response to said pixel being a white pixel:
      determining, for each of said white pixel's chrominance a and b values, a chrominance adjustment value, $a_{out}$ and $b_{out}$, respectively;
      determining a difference between said white pixel's luminance value and said background luminance, comprising:

$k=\max(0, \text{background}L-L)$;

modulating each of said chrominance adjustment values by said determined difference to obtain adjustA and adjustB, comprising:

$\text{adjust}A=(a_{out}*\text{ModulationTable2}[k]+8)>>4$;

$\text{adjust}B=(b_{out}*\text{ModulationTable2}[k]+8)>>4$; and applying said adjustA and adjustB to said white pixel's chrominance values a and b, respectively; and
   converting adjusted and non-adjusted pixels to an output space.

2. The method of claim 1, further comprising, in response to a difference between said white pixel's chrominance value and a predetermined chrominance offset being greater than zero, setting said white pixel's chrominance to a value of a maximum of any of: a) a difference between said white pixel's chrominance and said modulated chrominance adjustment value; and b) an amount of said predetermined chrominance offset.

3. The method of claim 1, further comprising, in response to a difference between said white pixel's chrominance value and a predetermined chrominance offset being less than or equal to zero, setting said white pixel's chrominance to a value of a minimum of any of: a) a sum of said white pixel's chrominance and said modulated chrominance adjustment value; and b) said amount of said predetermined chrominance offset.

4. The method of claim 1, wherein determining whether a pixel is a white pixel or a non-white pixel comprises determining a background luminance of said scanned image.

5. The method of claim 4, wherein determining whether a pixel is a white pixel or a non-white pixel comprises determining an amount of luminance variation in said scanned image.

6. A system for background suppression in a multi-function color scanning system, the system comprising:
 a storage medium capable of storing data; and
 a processor in communication with said storage medium, said processor capable of executing a machine readable instruction for performing the method of:
  scanning an image into a plurality of pixels;
  generating RGB color values for each of said pixels;
  converting said RGB color values for each of said pixels into a Lab color space to obtain a luminance value L, and chrominance values a and b for each pixel;
  determining a background luminance, backgroundL, of said scanned image;
  determining whether a pixel is a white pixel or a non-white pixel based on said pixel's luminance and chrominance values;
  in response to said pixel being a white pixel:
   determining, for each of said white pixel's chrominance a and b values, a chrominance adjustment value, $a_{out}$ and $b_{out}$, respectively;
   determining a difference between said white pixel's luminance value and said background luminance, comprising:

$k=\max(0, \text{background}L-L)$;

modulating each of said chrominance adjustment values by said determined difference to obtain adjustA and adjustB, comprising:

$\text{adjust}A=(a_{out}*\text{ModulationTable2}[k]+8)>>4$;

$\text{adjust}B=(b_{out}*\text{ModulationTable2}[k]+8)>>4$; and applying said adjustA and adjustB to said white pixel's chrominance values a and b, respectively; and
  converting adjusted and non-adjusted pixels to an output space.

7. The system of claim 6, further comprising, in response to a difference between said white pixel's chrominance value and a predetermined chrominance offset being greater than zero, setting said white pixel's chrominance to a value of a maximum of any of: a) a difference between said white pixel's chrominance and said modulated chrominance adjustment value; and b) an amount of said predetermined chrominance offset.

8. The system of claim 6, further comprising, in response to a difference between said white pixel's chrominance value and a predetermined chrominance offset being less than or equal to zero, setting said white pixel's chrominance to a value of a minimum of any of: a) a sum of said white pixel's chrominance and said modulated chrominance adjustment value; and b) said amount of said predetermined chrominance offset.

9. The system of claim 6, wherein determining whether a pixel is a white pixel or a non-white pixel further comprises determining a background luminance of said scanned image.

10. The system of claim 9, wherein determining whether a pixel is a white pixel or a non-white pixel further comprises determining an amount of luminance variation in said scanned image.

11. A computer program product for background suppression in a multi-function color scanning system, the computer program product comprising:
 a computer-usable data carrier storing instructions that, when executed on a computer, cause the computer to perform a computer-implemented method comprising:
  scanning an image into a plurality of pixels;
  generating RGB color values for each of said pixels;
  converting said RGB color values for each of said pixels into a Lab color space to obtain a luminance value L, and chrominance values a and b for each pixel;
  determining a background luminance, backgroundL, of said scanned image;
  determining whether a pixel is a white pixel or a non-white pixel based on said pixel's luminance and chrominance values;
  in response to said pixel being a white pixel:
   determining, for each of said white pixel's chrominance a and b values, a chrominance adjustment value, $a_{out}$ and $b_{out}$, respectively;
   determining a difference between said white pixel's luminance value and said background luminance, comprising:

$k=\max(0, \text{background}L-L)$;

modulating each of said chrominance adjustment values by said determined difference to obtain adjustA and adjustB, comprising:

$\text{adjust}A=(a_{out}*\text{ModulationTable2}[k]+8)>>4$;

$\text{adjust}B=(b_{out}*\text{ModulationTable2}[k]+8)>>4$; and applying said adjustA and adjustB to said white pixel's chrominance values a and b, respectively; and
  converting adjusted and non-adjusted pixels to an output space.

12. The computer program product of claim 11, further comprising, in response to a difference between said white pixel's chrominance value and a predetermined chrominance offset being greater than zero, setting said white pixel's chrominance to a value of a maximum of any of: a) a difference between said white pixel's chrominance and said modulated chrominance adjustment value; and b) an amount of said predetermined chrominance offset.

13. The computer program product of claim 11, further comprising, in response to a difference between said white pixel's chrominance value and a predetermined chrominance offset being less than or equal to zero, setting said white pixel's chrominance to a value of a minimum of any of: a) a sum of said white pixel's chrominance and said modulated chrominance adjustment value; and b) said amount of said predetermined chrominance offset.

14. The computer program product of claim 11, wherein determining whether a pixel is a white pixel or a non-white pixel comprises determining a background luminance of said scanned image.

15. The computer program product of claim 14, wherein determining whether a pixel is a white pixel or a non-white pixel comprises determining an amount of luminance variation in said scanned image.

* * * * *